(12) United States Patent
Shibata et al.

(10) Patent No.: US 7,137,138 B2
(45) Date of Patent: Nov. 14, 2006

(54) BROADCAST SIGNAL RECEIVING SYSTEM

(75) Inventors: Akira Shibata, Yamatokoriyama (JP);
Yoichi Ohgami, Yamatotakada (JP);
Kohzoh Hirata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 922 days.

(21) Appl. No.: 09/920,296

(22) Filed: Aug. 2, 2001

(65) Prior Publication Data
US 2002/0039393 A1 Apr. 4, 2002

(30) Foreign Application Priority Data
Oct. 3, 2000 (JP) .............................. 2000-303756

(51) Int. Cl.
*H04N 7/18* (2006.01)
(52) U.S. Cl. .............................. 725/81; 725/78; 725/82
(58) Field of Classification Search ................. 725/48, 725/119, 120, 143, 38, 118, 82, 80, 78, 81
See application file for complete search history.

(56) References Cited

U.S. PATENT DOCUMENTS

| | | | | |
|---|---|---|---|---|
| 4,167,703 A | * | 9/1979 | Suwa et al. ................. | 455/143 |
| 5,402,183 A | * | 3/1995 | Tanaka ........................ | 348/705 |
| 5,574,964 A | * | 11/1996 | Hamlin ........................ | 725/78 |
| 5,708,961 A | * | 1/1998 | Hylton et al. ................. | 725/81 |
| 5,880,721 A | * | 3/1999 | Yen .............................. | 725/81 |
| 5,982,411 A | * | 11/1999 | Eyer et al. .................... | 725/49 |
| 6,118,976 A | * | 9/2000 | Arias et al. ................... | 725/118 |

FOREIGN PATENT DOCUMENTS

| | | |
|---|---|---|
| GB | 2 188 515 A | 9/1987 |
| JP | 05-336472 A | 12/1993 |
| JP | 06-181590 A | 6/1994 |
| JP | 08-314979 | 11/1996 |
| JP | 3037909 | 11/1996 |
| JP | 9-116498 | 5/1997 |
| JP | 10-51464 | 2/1998 |
| JP | 11-55618 | 2/1999 |
| JP | 11298879 A | 10/1999 |
| JP | 2000-41079 | 2/2000 |
| JP | 2000-59404 | 2/2000 |
| JP | 2000-090512 A | 3/2000 |
| JP | 2000-115664 A | 4/2000 |

OTHER PUBLICATIONS

Office Action in JP 2000-303756 dated Nov. 8, 2005.
"How to capture the market of domestic information wiring", Telecommunication, Ric Telecom Co., Ltd., Jul. 25, 2000, vol. 17, No. 8, pp. 26-40. (partial translation).
Minoru Shikada et al. "Next Generation Home Network", NEC Technical Journal, Aug. 25, 1999, vol. 52, No. 8, pp. 58-61. (partial translation).

* cited by examiner

*Primary Examiner*—Chris Kelley
*Assistant Examiner*—Michael Van Handel
(74) *Attorney, Agent, or Firm*—Nixon & Vanderhye, PC

(57) ABSTRACT

Various kinds of broadcast TV signals can be watched on display devices at desirable places (rooms). High-frequency signals of CS broadcast, BS broadcast and terrestrial broadcast are received and inputted via a lead wire to a retransmission device. A high-frequency signal of a cable television broadcast is directly inputted to the retransmission device. The retransmission device subsequently converts high-frequency signals of incoming different broadcasts into common high-frequency signals and transmits them in time-series. Then, the common high-frequency signals are transmitted by wired or wireless means to a plurality of display devices that may be installed in different rooms or are portable.

4 Claims, 6 Drawing Sheets

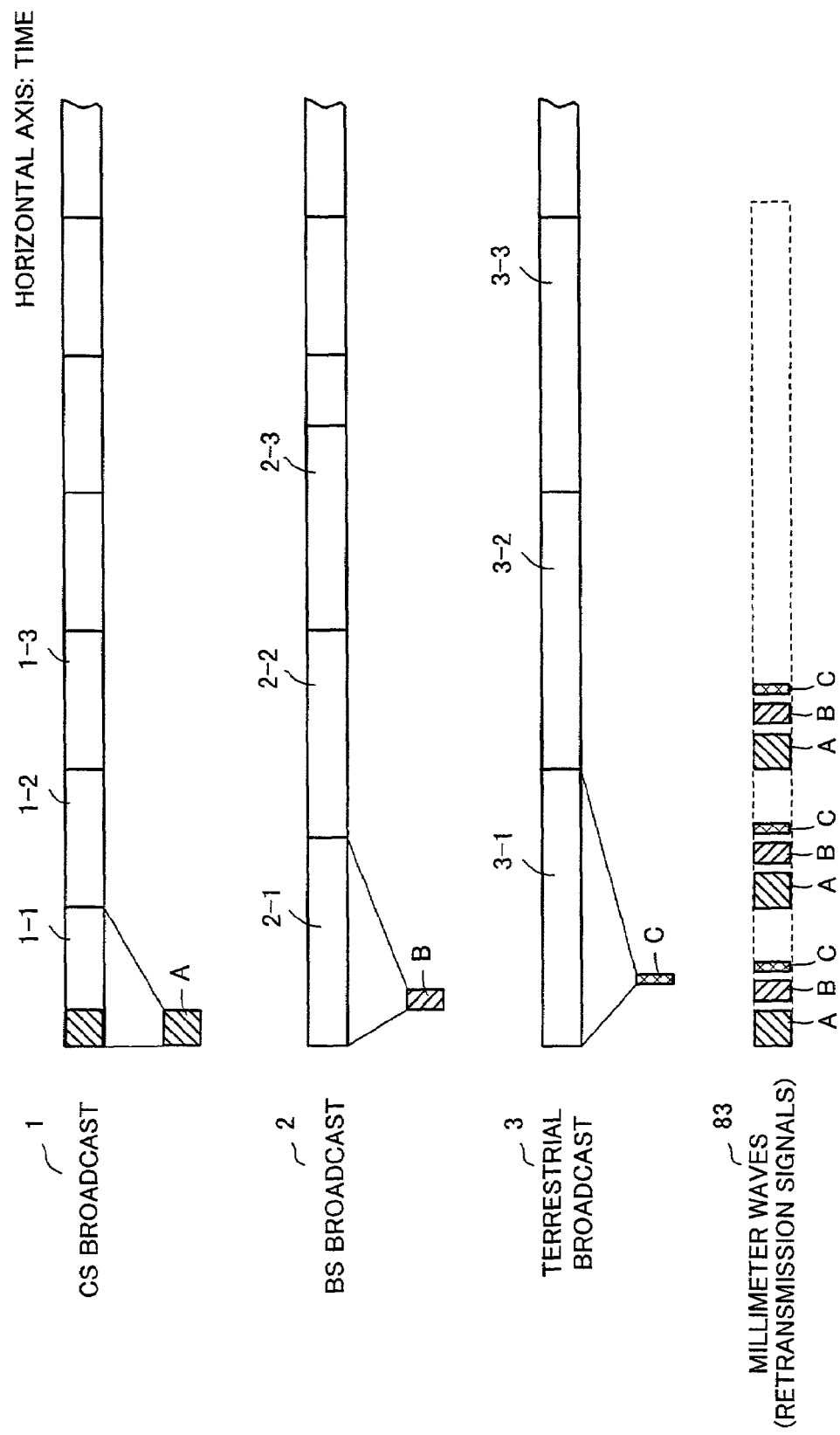

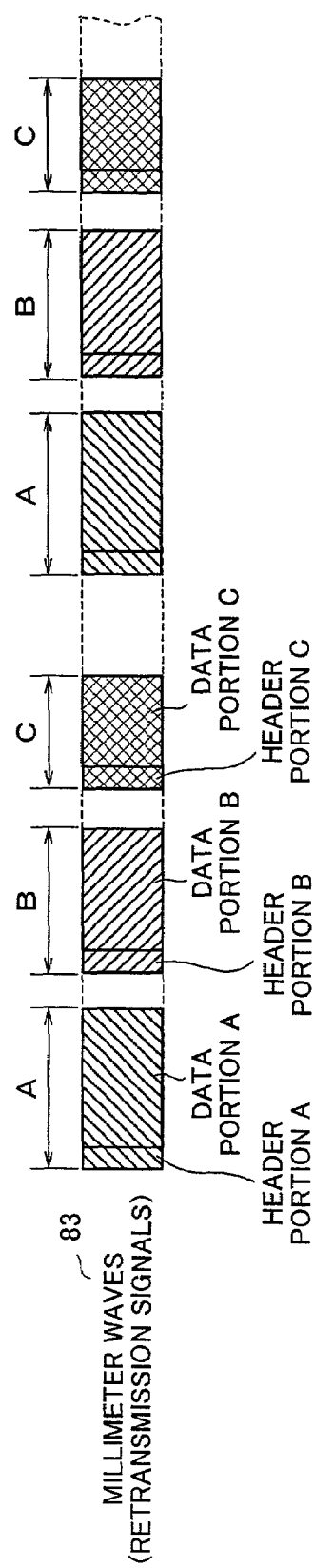

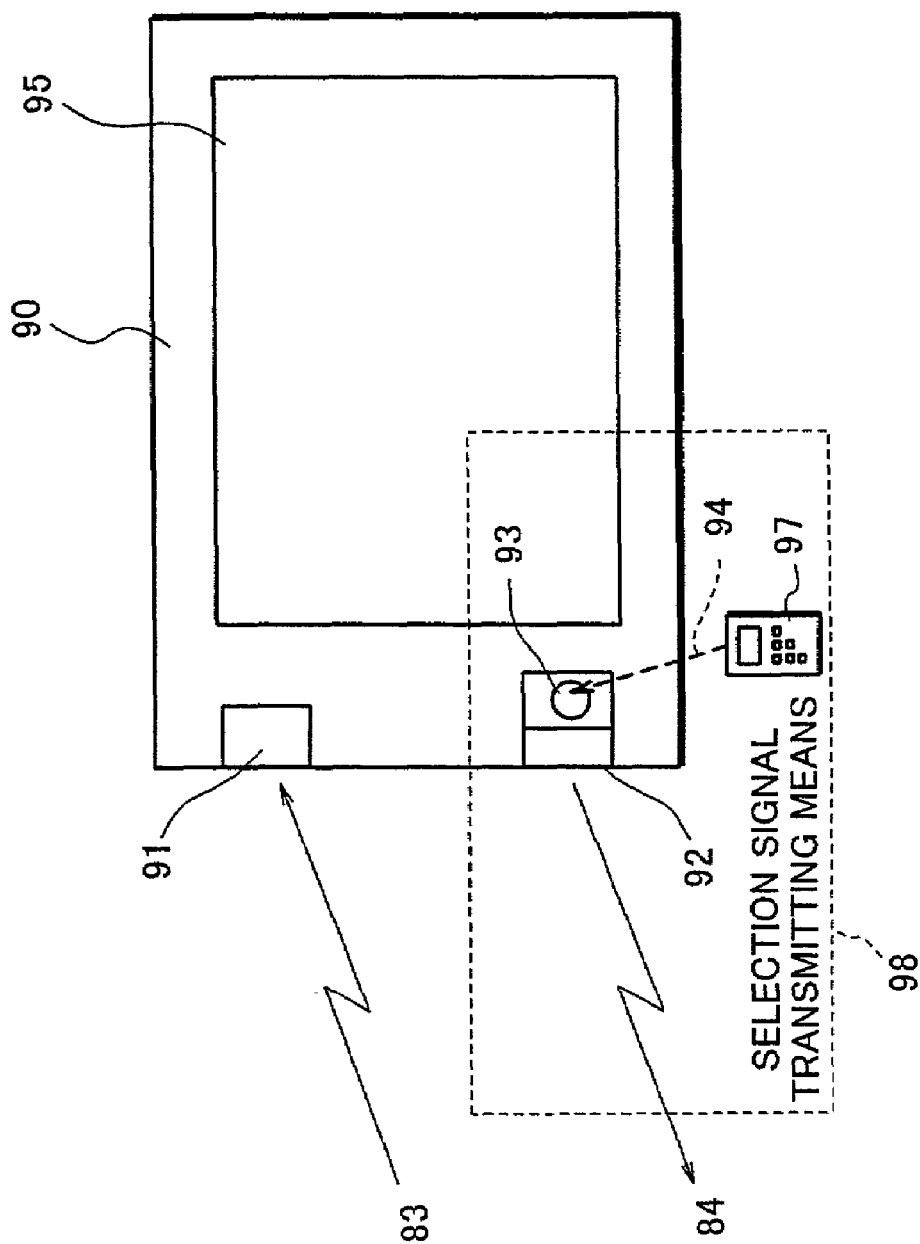

BROADCAST SIGNAL RECEIVING SYSTEM

BACKGROUND OF THE INVENTION

The present invention relates to a home network system capable of collectively receiving various broadcasts, converting received data into common digital data and transmitting the same content broadcast or different content broadcasts to a plurality of display devices.

Recently, there has been available a variety of broadcasting services which are terrestrial analog broadcasting, BS analog broadcasting, CS broadcasting, CATV and so on. Generally, subscribers-viewers selectively receive broadcasts at home terminals according to preferences, local conditions and service contents.

With this, each member in each home may always want to watch preferred programs in a desired way at a particular place.

In addition, the development of the digital technology accelerates the digitalization of the broadcasting services including BS and terrestrial digital broadcasting services.

FIG. 1 is a view for explaining conventional broadcast receiving means for receiving various broadcasting services.

The indoor connection system for receiving, for example, CS (Communication Satellite) broadcasting services in a home is as follows:

The CS broadcast 1 is received by a CS receiving antenna 5 and input to a CS receiver (or a set top box) 9 whereby the received television broadcast signal is converted into a signal to be displayed on a CS display 13.

The connection systems for receiving BS broadcasting and terrestrial broadcasting are analogous to that of the CS broadcasting and comprise respectively antennas 6, 7, receivers 10, 11, and displays 14, 15 in the described order.

Terrestrial broadcasts (VHF, UHF) are received by a so-called television set 17 in which a receiver 11 and a display 15 are combined.

Cable television (CATV) broadcasts transmitted over a cable network are received by a receiver (or a set top box) 12 and converted into a television signal to be displayed on a display unit for CATV 16.

As described above, each viewer (user) has to prepare in his or her home separate receivers and display units for viewing respective broadcasts (CS, BS, Terrestrial and CATV broadcasting services) (except display units usable common to receive the BS broadcasting and the terrestrial broadcasting).

The problems of the prior techniques are as follows:
(1) To enjoy various broadcasting services, the user selects in advance a place (room) for enjoying the broadcasting services, extends thereto respective coaxial cables from respective antenna receivers coupled to respective antennas (aerials), connects the cables to respective specific receivers and finally connects with connecting cables the respective specific receivers to a television receiver(s) (display unit(s)).
(2) In order to enjoy the various kinds of broadcasts in another place (other than the selected place as the above (1)), the user must extend to a newly selected place a coaxial cable from a distributor connected to respective antenna portions.
(3) To change the receiving place (room) for a particular broadcast service to another place (room), the user must extend to a newly selected place (another place) a coaxial cable from a distributor connected to a corresponding antenna portion, disconnect the corresponding receiver, replace it to the new place and then reconnect the receiver to the receiver to the display unit at the new place.
(4) The user cannot receive all kinds of broadcasts on a single television receiver and can enjoy only a limited number of the broadcasting services, each of which is received by a specific receiver connected to a corresponding receiving means of the television receiver.

SUMMARY OF THE INVENTION

A primary object of the present invention is to provide a broadcast signal receiving system capable of receiving a variety of broadcast signals at any desired indoor place (room) with no special wiring works.

Another object of the present invention is to provide a broadcast signal receiving system comprising retransmission device for receiving a plurality of high-frequency signals of different broadcast signaling systems and converting the received signals into high-frequency signals of a common signaling system, and a plurality of display devices for receiving the high-frequency signals transmitted from the retransmission device and displaying contents of the received signals.

Another object of the present invention is to provide a broadcast signal receiving system, wherein the retransmission device is provided with a plurality of a broadcast receiving means for receiving and demodulating a plurality of high-frequency signals of different broadcast signaling systems, and converting the received signals into a plurality of different baseband signals, a signal selecting means for selecting one or plural baseband signals from the plural difference baseband signals, a parallel-to-serial converting means for inputting in parallel the baseband signals outputted from the signal selecting means, rearranging the inputted signals into serial signals and outputting the serial signals and a common signal transmitting means for converting the baseband signals from the parallel-to-serial converting means into high-frequency signals of the common signaling system and transmitting the converted signals, and the plural display devices is provided with a common signal receiving means for receiving the high-frequency signals of the common signaling system and a display means for displaying broadcast contents of the received signals from the common signal receiving means.

Another object of the present invention is to provide a broadcast signal receiving system, wherein the display device is provided with a selection signal transmitting means for transmitting a selection signal for selecting a desired one of high-frequency signals of the plural different signaling systems and the retransmission device is provided with a selection signal receiving means for receiving the selection signal, demodulating/converting the selection signal into switching signals for the signal selecting means.

Another object of the present invention is to provide a broadcast signal receiving system, wherein the selection signal transmitting means is provided with an IR (infrared)-receiving portion for receiving a selection signal from an infrared remote control transmitter and a radio transmitting portion for transmitting in the form of radio waves the selection signal from the IR-receiving portion, and the selection signal receiving means is provided with a receiver for receiving the selection signal transmitted from the radio-transmitting portion.

Another object of the present invention is to provide a broadcast signal receiving system, wherein the plural broadcast receiving means comprise plural receivers and demodulators corresponding to high-frequency signals of different signaling systems and power switching means for turning on and off respective power supply circuits of the plural receivers and demodulators, and the signal selecting means turns ON the power supply circuits of the receiver and demodulator related to selected signal and turns OFF the power supply circuits related to not-selected signal.

Another object of the present invention is to provide a broadcast signal receiving system, wherein the high-frequency signal of the common signaling system has a frequency band of the millimeter wavelength.

BRIEF DESCRIPTION OF THE DRAWINGS

FIG. 4 is a view for explaining an embodiment of a retransmission signal to be transmitted from the retransmission device of a broadcast signal receiving system according to the present invention.

FIG. 5 is a view for explaining another embodiment of a retransmission signal to be transmitted from the retransmission device of a broadcast signal receiving system according to the present invention.

FIG. 6 is an external view of a display device usable in a broadcast signal receiving system according to the present invention.

PREFERRED EMBODIMENT OF THE INVENTION

The present invention is directed to an indoor broadcast retransmission system comprising a retransmission means for receiving a plurality of different broadcasts from the outdoors, converting the received broadcast signals into common signals and re-transmitting the common signals to a specified place and a displaying means for displaying the retransmitted data.

A broadcast signal receiving system according to an embodiment of the present invention will be described below with reference to the accompanying drawings.

Figure 1:
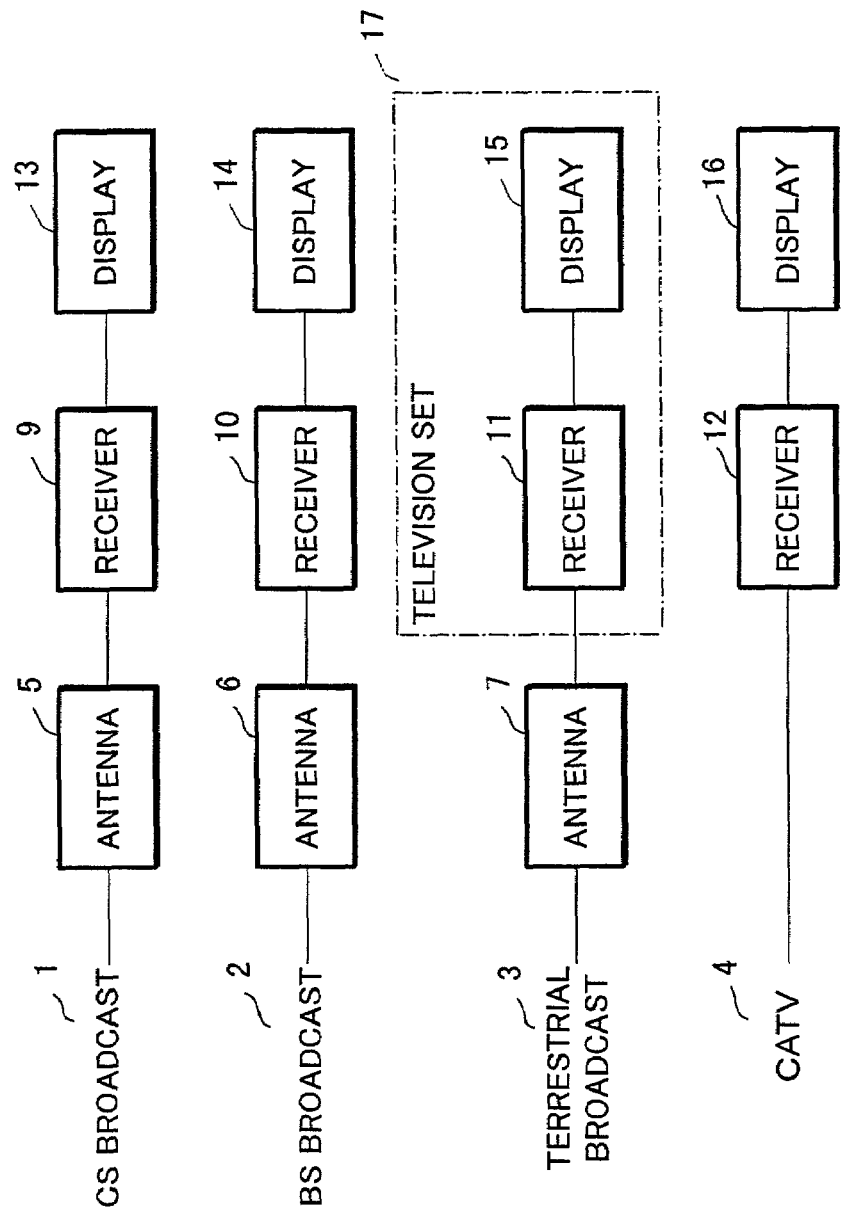
FIG. 1 is a view for explaining a variety of conventional broadcast receiving means.
Figure 2:
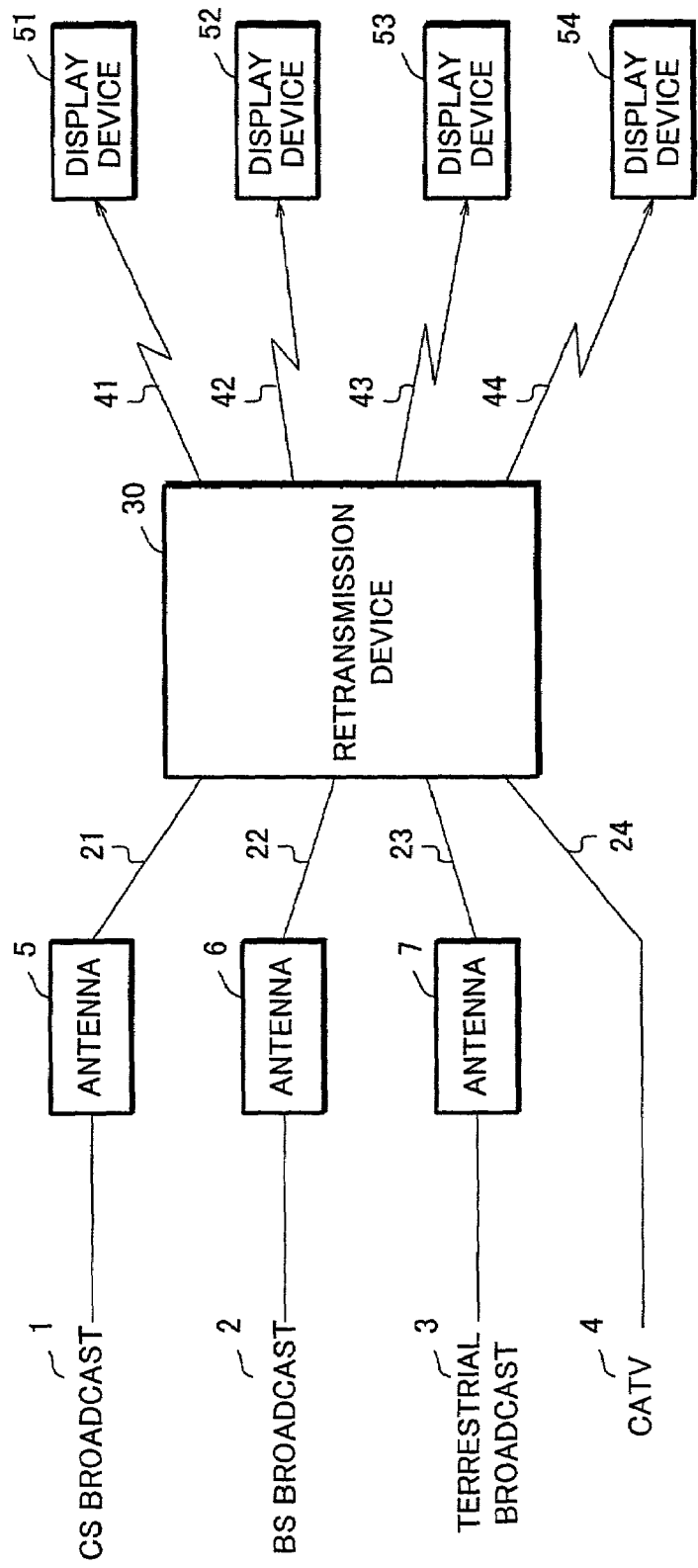
FIG. 2 is a conceptual general construction view of a broadcast signal receiving system according to the present invention.

FIG. 2 is a conceptual general construction view of a broadcast signal receiving system according to the present invention.

High-frequency signals of CS broadcast 1, BS broadcast 2 and terrestrial broadcast 3 are received via antennas 5–7 and inputted via lead wires 21–23 to a retransmission device 30.

A high-frequency signal of a cable television broadcast (CATV) is inputted via a lead wire 24 to a retransmission device 30.

The retransmission device 30 converts high-frequency signals of different broadcasts received from the outdoors into common high-frequency signals.

Then, the common high-frequency signals are transmitted with a transmission cable or radio means (the latter is preferable from the view point of its portability) to a plurality of display devices 51–54, which may be installed in respective rooms or may be portable.

The retransmission device 30 subsequently converts the high-frequency signals of plural different broadcasts (e.g., CS broadcast 1, BS broadcast 2, terrestrial 3 and CATV 4) into common frequency signals and transmits them in time-series.

Reception of all or desirable kinds of different broadcasts (CS broadcast 1, BS broad cast 2, terrestrial broadcast 3, CATV 4) can be separately selected by a selecting means provided inside or outside of the retransmission device 30.

The transmission means for transmitting the common high-frequency signals from the retransmission device 30 to the display devices 51–54 may be any of cable means or radio means. However, the radio transmission with no need for troublesome wiring is preferable.

Nowadays, both the line transmission system and the wireless (radio) transmission system may handle both analog signals and digital signals but the conventional analog transmission systems are gradually being replaced with digital transmission systems since the digital signals have some outstanding advantages over the analog signals: ease of reprocessing and noise immunity. Accordingly, it is surely anticipated that all transmission systems will be digitalized to handle only digital signals in the near feature.

The digital radio transmission systems are represented by
(1) 2.4 GHzSS (Spread Spectrum) system that is based on IEEE-802.11b standard and possesses a data transmission rate of 11 Mbps and
(2) 5.2 GHzOFDM (Orthogonal Frequency Division Multiplex) system that is based on IEEE-802.11a standard and possesses a data transmission rate of 36 Mbps. The data transmission rate of the digital radio system at 60 GHz of a millimeter wavelength band is of 100 Mbps order. The digital radio system, therefore, can afford to transmit three channels of digital video (DV) format 33 Mbps, which is excellent in high-speed transmission and best suited for use in the broadcast signal receiving system of the present invention.

The display devices 51–54 receive common high-frequency signals transmitted from the retransmission device 30 and can select anyone of broadcasts, e.g., CS broadcast 1, BS broadcast 2, terrestrial broadcast 3 and CATV 4.

The display devices 51–54 may be of any of floor-mounted, wall-mounted and portable types and may be powered from any of power sources, e.g., an AC power supply, a primary cell and a secondary cell.

If the radio transmission system is selected in view of ease of wiring for the broadcast receiving system, it is preferable to use portable type display devices. In this regard, a portable type thin and light liquid-crystal display with a battery power supply incorporated therein may be most suitable to use in the above-described system.

Figure 3:
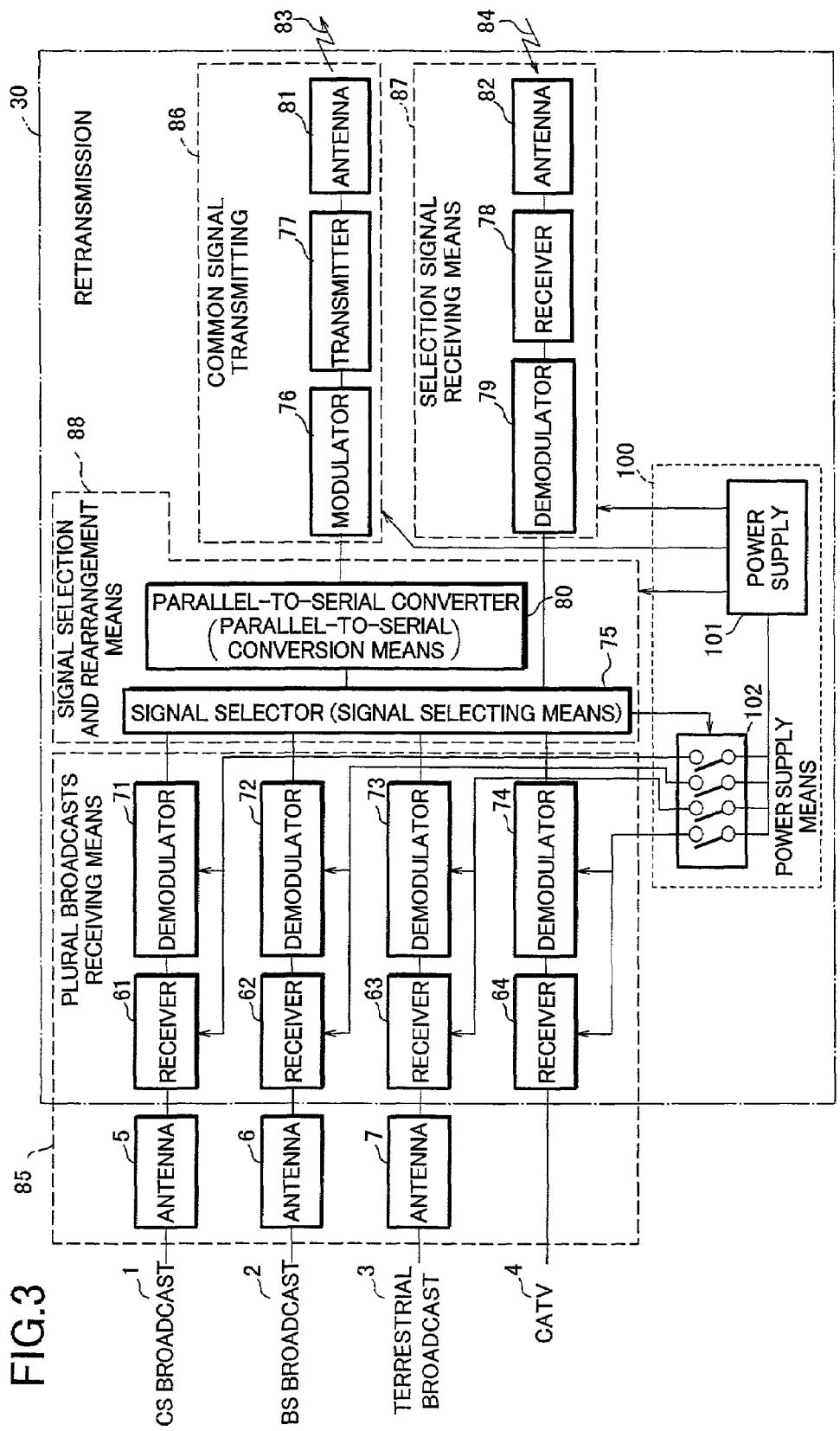
FIG. 3 is a detailed construction view of a retransmission device of a broadcast signal receiving system according to the present invention.

FIG. 3 shows a detailed construction of a retransmission device of a broadcast signal receiving system according to the present invention.

The retransmission device 30 is composed mainly of a plural broadcast receiving means 85, a signal selection and rearrangement means 88, a common signal transmitting means 86, a selection signal receiving means 87 and power supply means 100.

The plural broadcasts receiving means 85 receives a broadcast, e.g., CS broadcast 1 by an antenna 5 and converts the received high-frequency signal into an intermediate-frequency signal by a receiver 61, demodulates the intermediate-frequency signal by a demodulator 71 to generate a baseband signal.

Similarly, BS broadcast 2 and terrestrial broadcast 3 are received respectively by antennas 6, 7, converted into intermediate-frequency signals by receivers 62, 63 and converted into baseband signals by demodulators 72, 73.

A broadcasting signal (CATV 4) transmitted over a cable from a cable-television station is received directly by a receiver 64 where it is converted into an intermediate-frequency signal that is further converted into a baseband signal by a demodulator 74.

The signal selection and rearrangement means 88 selects a single broadcast or plural broadcasts by a signal selector 75 incorporated therein.

The selection of broadcasts is made based upon a selection transmission signal from a display device as described later. It is, of course, possible to enable the retransmission device to decide the selection of broadcasts by using a selecting means specially provided therein.

The signal selector 75 selects one of available kinds of broadcasting when one user wants to watch a broadcast on a display device and it selects plural kinds of broadcasting when plural viewers want to watch different broadcasts on different display devices.

The maximal number of broadcasting signals selectable at a time is determined by the transmission ability defined by the common signal transmitting means 86. For example, the transmission rate is 100 Mbps for millimeter wavelength of 60 GHz. It is 36 Mbps for 5.2 GHz of IEEE802.11a Standard and 11 Mbps for 2.4 GHz of IEEE802.11b Standard.

The signal selection and rearrangement means 88 is composed of a signal selector 75 for selecting a single broadcast or plural broadcasts and a parallel-to-serial converter 80 for converting a plurality of parallel different broadcast signals selected by the signal selector 75 into serial signals. The retransmission device 30 designed specially for selecting a single broadcast signal does not require the parallel-to-serial converter whilst the retransmission device designed for selecting a plurality of different broadcast signals to be displayed concurrently on plural different display devices must use a combination of the signal selector 75 with the parallel-to-serial converter 80.

The signal selection and rearrangement means 88 effectively works in combination with the power supply means 100 in such a way as described below.

Once a viewer selects a desirable broadcast, the signal selector 75 receives the user selection via the selection signal receiving means 87 and a power switch 102 of the power supply means 100 turns ON the power supply to a selected one of the receivers 61–64 and demodulators 71–74 of the multiple broadcast receiving means 85 so that only the selected broadcast may be sent to the signal selector 75. Thus, only the broadcast signal selected by the viewer is transferred to the signal selector 75 wherefrom it is sent via the parallel-to-serial converter 80 to the common signal transmitting means 86.

The power supply 101 can supply electric power via a power switch 102 to receivers 61–64 and demodulators 71–74 in the multiple broadcast receiving means 85 as well as the signal selection and rearrangement means 88, the common signal transmitting means 86 and the selection signal receiving means 87.

The power switch 102 turns ON the reception of a selected broadcast or broadcasts and turns OFF the reception of not-selected broadcasts. This adds a power-saving feature to the retransmission device.

The broadcast signal selected and serially converted by the signal selection and rearrangement means 88 is transferred to the common signal transmitting means 86 wherefrom it is sent, for example, as a millimeter wavelength signal 83 to the display device 90 to be described later with reference to FIG. 6.

A baseband signal of the broadcast selected by the signal selector 75 and serially rearranged by the parallel-to-serial converter 80 is converted by a modulator 76 to a signal modulated by a given analog or digital modulation method.

The modulation method may be for example a digital modulation method represented by MPEG2 (Moving Picture Expert Group 2).

The modulated signal is transmitted from a transmitter 77 via an antenna 81 to the display device 90.

The transmission signal may be a radio signal (millimeter wavelength radio is most desirable) or a line-transmission signal if it can execute the necessary function.

Another important function of the retransmission device 30 is to control the signal selection means (signal selector) 75 provided in the common signal transmitting means 86 for selecting a signal to be transmitted.

Generally, the viewer (user) selects one of available broadcasts (e.g., CS, BS, terrestrial and CATV) and one of channels for the desirable broadcast at a place near a display device that he/she currently uses.

Therefore, the retransmission device 30 receives a user's selection signal from the display device 90, selects a corresponding broadcast signal by the signal selector 75, converts the selected broadcast signal into serial signal and transmits the common signal of the selected broadcast by the common signal transmitting means 86 to the display device.

The transmission of the selection signal to the signal selector 75 is as follows:

The selection (switching) signal from the display device 90 is transmitted usually in the form of radio waves (radio 84) and captured by an antenna 82 of the selection signal receiving means 87. The received selection signal is converted by the receiver 78 into an intermediate frequency signal that is then converted by the demodulator 79 into a baseband signal of the selected broadcast. The baseband signal is inputted to the signal selector 75 of the signal selection and rearrangement means 88. The selector 75 selects the broadcast signal and the channel.

Namely, the above method is to receive a selection (switching) signal from the display device 90 by the selection signal receiving means 87 and transfer it to the signal selector 75 that selects the broadcast and the channel according to the selection signal. Alternatively, the retransmission device 30 may include a selecting means and allows the user to directly select a desirable broadcast by using a selection switch provided in the device or by transmitting a selection signal from a remote control to a remote control receiver provided in the device.

Now, the configuration of the system in which plural different broadcasts are displayed on plural display devices will be described below.

As described above, the system (FIG. 3) of the present invention is featured by receiving a plurality of different broadcasts such as CS broadcast, BS broadcast, terrestrial broadcast and CATV broadcast and re-transmitting the received broadcasts by common signal transmitting means 86 to plural respective display devices 90.

In this instance, the display devices 90 are assumed to concurrently display different broadcast contents whilst they may, of course, display the same broadcast content at a time.

FIG. 4 is a view for explaining an embodiment of retransmission signals to be transmitted from the re-transmitting means of a broadcast signal receiving system according to the present invention.

In FIG. 4, there is shown the case of displaying three different broadcasts, i.e., CS broadcast (1), BS broadcast (2) and terrestrial broadcast (3) on three display devices respectively.

CS broadcasts are now digitally broadcast. It is now assumed that video information received from a CS broadcast changes, frame by frame, from 1-1 to 1-2 and 1-3 and each one-frame signal is selected by the signal selector 75 and converted by the parallel-to-serial converter 80 into a common signal A (in practice, it changes from A-1 to A-2 and A-3).

If video is received at a rate of 34 Mbps by a transmission method MPEG2 and then retransmitted by the same method, the CS broadcast signal A has a time length substantially equal to that of the frame 1-1.

When a carrying means of the common signal transmitting means 86 is millimeter waves, the re-transmittable common signal may be generally modulated by using such a modulation method that the signal A may be shorter than the corresponding frame.

The BS broadcasting is now gradually being shifted from analog to digital. Similarly, received signals of a current analog BS broadcast changes, frame by frame, from 2-1 to 2-2 and 2-3 and a one-frame signal is converted by the signal selector 75 and converted by the parallel-to-serial converter 80 into a common signal B.

This signal B corresponds 10 Mbps at a level of MPEG2. (The future digital transmission rate will be increased to that of the CS broadcasting.) It is also assumed that a common one-frame signal C of the terrestrial broadcast corresponds to 8 Mbps at a level of MPEG2.

The signal selector 75 subsequently transfers plural signals (three CS, BS and terrestrial broadcast signals in the shown case) to the modulator 76 of the common signal transmitting means 86.

In this instance, a total transmission rate of three (CS, BS and terrestrial) broadcast signals is 52 Mbps (34 Mbs+10 Mbps+8 Mbps). On the other hand, the transmission rate of millimeter waves for carrying common signals is 100 Mbps. This common signal transmitting means can afford to transmit the above three different broadcast signals.

Namely, it is obvious that the common signals can be surely transmitted since the total time of (A+B+C) is has a large allowance as compared with an interval time allowable as a transmission time of common signals.

In each broadcast circuit, a modulator may be provided after the demodulator (71–74) and before the signal selector 75 to transfer the common signals through the signal selector 75 and the parallel-to-serial converter 80 to the common signal transmitting means (composed of transmitter 77 and antenna 81 in this instance).

In this case, a modulated signal of each broadcast is selected by the signal selector 75, converted into serial data by the parallel-to-serial converter 80 and then transmitted by the common signal transmitting means 86. This arrangement has no need of modulating all different broadcast signals by a single modulator, thereby achieving smooth transmission of the various different broadcast signals.

FIG. 5 illustrates another embodiment of a retransmission signal to be transmitted from the retransmission device of a broadcast signal receiving system according to the present invention.

This embodiment can reduce an error in selection of different broadcasting signals by the signal selector.

Namely, when the device recognizes CS, BS and terrestrial broadcasting signals respectively and converts them into common signals (re-transmittable signals), it may add a header to each of the common signals A (CS broadcast signal), B (BS broadcast signal) and C (terrestrial broadcast signal) so that each of the display devices can identify the selected broadcast signal by the header of the common signal and display the correct broadcast on its display screen.

FIG. 6 is an external view of a display device usable in a broadcast signal receiving system according to the present invention.

The display device is composed mainly of a receiving means for receiving common signals of different broadcasts (e.g., CS, BS, terrestrial and CATV broadcasts) transmitted from the retransmission device 30 and a display means.

Namely, the common video signals are transmitted for example as particularly recommendable millimeter waves 83 from the retransmission device 30 to the display device 90 that can receive the common signals by a common signal receiving means, e.g., millimeter wave receiving portion 91 incorporated therein, and display by the display means, e.g., a display portion 95.

The display portion 95 may be, but not limited to, a LCD, a CRT display, a plasma display or a FED (Field Emission Display).

The screen size of the display may be selected by users in accord with its application. Options are, for example, a portable type 12- or 14-inch-screen liquid-crystal display, a floor- or wall-mounted type 28-inch-screen LCD or 40-inch-screen plasma display, a 100-inch wall-projection type LCD and so on.

The display device 90 includes a selection signal transmitting means 98 for transmitting a selection signal to the selection signal receiving means 87 of the retransmission device 30 shown in FIG. 4.

The transmission of a selection signal is achieved as follows:

(1) The viewer (user) sends a remote control signal 94 from a remote control infrared transmitter 97 to a remote control IR-signal receiving portion 93 in the display device 90 to select any one of CS, BS, terrestrial and CATV broadcasts, a channel and a volume.

(2) The selection signal is transferred from the remote-control IR-receiving portion 93 to a radio-transmission portion 92 wherefrom it is sent as radio waves 84 to the antenna 82 of the selection signal receiving means 87 of the retransmission device 30.

(3) In the retransmission device 30, the received selection signal is processed by the selection signal receiving means 87 to select the required broadcast signal as described before with reference to FIG. 3.

Although the embodiments described hereto applies the wireless transmission of information between the display device 90 and retransmission device 30 by using millimeter radio waves for transmitting common signals such as video signals and by using radio waves for transmitting selection signals for selecting broadcasts and channels, it may also use a cable means or infrared radiation as the transmitting means.

Furthermore, the system of the present invention basically supposes that each user can freely select the location of each display device 90, for example, close to the retransmission device 30 or remote therefrom, for example, in another room on the same floor or different floors (1st and 2nd floor, 1st floor and 3rd floor) or a veranda within a reachable distance of the transmitting means.

Accordingly, the wireless transmission is best suited for use in the system of the present invention.

As will be apparent from the foregoing, the broadcast signal receiving system according to the present invention offers the following advantageous effects:

The conventional system requires the provision of specific receivers and display devices to watch different broadcasts (CS, BS, terrestrial and cable TV broadcasts) and requires additional wiring to watch any broadcast in another room. In contrast, the system of the present invention uses a retransmission device for collectively receiving all different kinds of broadcasts, converting the received broadcast signals into common signals and retransmitting the common signals to combination with a plurality of display devices for receiving the common signals from the retransmission device. This system enables each user to watch a preferred broadcast program at a desired place.

The application using millimeter waves as radio transmission of the common signals from the retransmission device to display devices enables the user to more freely select a place of viewing a preferred TV program. This also allows viewers to concurrently watch different programs on separate display devices at different places. For example, it becomes possible for each family member to enjoy a preferred program in a comfortable pose at a favorite place. Namely, such individual requirements can be satisfied.

Each display device is provided with a remote control means allowing the viewer to freely select any broadcasting station by remotely controlling the retransmission device.

On the other hand, the provision of power switching means capable of selectively turning ON only a receiver and a demodulator relevant to the selected broadcast. This provides a power-saving retransmission device.

The invention claimed is:

1. A broadcast signal receiving system comprising a retransmission device for collectively receiving a plurality of high-frequency signals of different broadcast signaling systems and converting the received signals into high-frequency signals of a common signaling system, and a plurality of display devices for receiving the high-frequency signals transmitted from the retransmission device and displaying contents of the received signals, wherein the retransmission device is provided with a plurality of broadcast receiving means for receiving and demodulating the plurality of high-frequency signals of different broadcast signaling systems, and converting the received signals into a plurality of different baseband signals, a signal selecting means for selecting one or plural baseband signals from the plurality of different baseband signals, a parallel-to-serial converting means for inputting in parallel the baseband signals outputted from the signal selecting means, rearranging the inputted signals into serial signals and outputting the serial signals, and a common signal transmitting means for converting the baseband signals from the parallel-to-serial converting means into high-frequency signals of the common signaling system and transmitting the converted signals, and each of the plurality of display devices is provided with a common signal receiving means for receiving the high-frequency signals of the common signaling system and a display means for displaying the broadcast contents of the received signals from the common signal receiving means, and wherein the plurality of broadcast receiving means comprise plural receivers and demodulators corresponding to the high-frequency signals of different broadcast signaling systems and power switching means for turning on and off respective power supply circuits of the plural receivers and demodulators, and the signal selecting means turns ON the power supply circuits of the receiver and demodulator related to the selected baseband signal and turns OFF the power supply circuits related to other receivers and demodulators.

2. A broadcast signal receiving system as defined in claim 1, wherein one or more of the display devices is provided with a selection signal transmitting means for transmitting a selection signal for selecting a desired one of the high-frequency signals of different broadcast signaling systems and the retransmission device is provided with a selection signal receiving means for receiving the selection signal and demodulating/converting the selection signal into switching signals for the signal selecting means.

3. A broadcast signal receiving system as defined in claim 2, wherein the selection signal transmitting means is provided with an infrared-receiving portion for receiving a selection signal from an infrared remote control transmitter and a radio-transmitting portion for transmitting in the form of radio waves the selection signal from the infrared-receiving portion, and the selection signal receiving means is provided with a receiver for receiving the selection signal transmitted from the radio-transmitting portion.

4. A broadcast signal receiving system as defined in claim 1, wherein the high-frequency signal of the common signaling system has a frequency of about 2.4 GHz or about 5.2 GHz.

* * * * *